United States Patent
Rohs (10) Patent No.: US 10,422,419 B2
(45) Date of Patent: Sep. 24, 2019

(54) CONICAL FRICTION RING TRANSMISSION AND METHOD FOR OPERATING A CONICAL FRICTION RING TRANSMISSION

(71) Applicant: Ulrich Rohs, Dueren (DE)

(72) Inventor: Ulrich Rohs, Dueren (DE)

(*) Notice: Subject to any disclaimer, the term of this patent is extended or adjusted under 35 U.S.C. 154(b) by 302 days.

(21) Appl. No.: 15/506,476

(22) PCT Filed: Aug. 14, 2015

(86) PCT No.: PCT/DE2015/100338
§ 371 (c)(1),
(2) Date: Feb. 24, 2017

(87) PCT Pub. No.: WO2016/041545
PCT Pub. Date: Mar. 24, 2016

(65) Prior Publication Data
US 2017/0370466 A1 Dec. 28, 2017

(30) Foreign Application Priority Data

Sep. 17, 2014 (DE) .................. 10 2014 013 468

(51) Int. Cl.
*F16H 57/00* (2012.01)
*F16H 57/04* (2010.01)
*F16H 15/42* (2006.01)

(52) U.S. Cl.
CPC ..... *F16H 57/0423* (2013.01); *F16H 57/0465* (2013.01); *F16H 57/0491* (2013.01); *F16H 15/42* (2013.01); *F16H 57/0441* (2013.01)

(58) Field of Classification Search
CPC ............. F16H 57/0423; F16H 57/0465; F16H 57/0491; F16H 15/42; F16H 57/0441
See application file for complete search history.

(56) References Cited

U.S. PATENT DOCUMENTS 2,546,211 A 3/1951 Blackburn
4,100,821 A 7/1978 Geiger
(Continued)

FOREIGN PATENT DOCUMENTS

CN 102052452 A 5/2011
DE 25 51 934 C2 4/1977
(Continued)

OTHER PUBLICATIONS

Chinese Office Action dated Nov. 5, 2018 in Chinese Application No. 201580050109.9.
(Continued)

*Primary Examiner* — David M Fenstermacher
(74) *Attorney, Agent, or Firm* — Collard & Roe, P.C.

(57) ABSTRACT

A conical friction ring transmission has a fluid supply for wetting at least one of the main transmission elements with fluid. The fluid supply has a drop dispenser from which fluid drops onto the main transmission element and/or an outlet from which fluid falls onto the main transmission element. A method operates a conical friction ring transmission, wherein the friction ring of the conical friction ring transmission is moved in the spacing between the two friction rings, and at least one of the main transmission elements is wetted with fluid via a fluid supply. The fluid is conducted in a circuit at a pressure below 100 kPa (1 bar) for wetting purposes.

12 Claims, 5 Drawing Sheets

(56) References Cited

U.S. PATENT DOCUMENTS

| | | | |
|---|---|---|---|
| 7,559,868 B2 | | 7/2009 | Rohs et al. |
| 8,919,500 B1 * | | 12/2014 | Kilcrease .................. F01M 9/06 |
| | | | 184/11.5 |
| 9,528,593 B2 * | | 12/2016 | Tage .................. F16H 57/0423 |
| 9,581,236 B2 * | | 2/2017 | Tage .................. F16H 57/0423 |
| 2009/0247352 A1 | | 10/2009 | Kamiya et al. |
| 2011/0143881 A1 | | 6/2011 | Yamashita et al. |
| 2011/0152030 A1 | | 6/2011 | Yamashita et al. |
| 2011/0214947 A1 | | 9/2011 | Tuomas |

FOREIGN PATENT DOCUMENTS

| | | |
|---|---|---|
| DE | 1 39 446 A1 | 1/1980 |
| DE | 195 42 726 A1 | 5/1997 |
| DE | 103 03 896 A1 | 6/2004 |
| DE | 10 2007 018 504 A1 | 10/2008 |
| DE | 11 2009 000 037 T5 | 9/2010 |
| DE | 10 2009 052 595 A1 | 5/2011 |
| FR | 2 751 726 A1 | 1/1998 |
| JP | H01-164864 A | 6/1989 |
| JP | H08 210475 A | 8/1996 |
| JP | 2002 364739 A | 12/2002 |
| JP | 2011-256969 A | 12/2011 |
| JP | 2012-180866 A | 9/2012 |
| WO | 2007025522 A2 | 3/2007 |

OTHER PUBLICATIONS

International Search Report of PCT/DE2015/100338, dated Nov. 24, 2015.
German Search Report in DE 10 2014 013 468.7, dated May 29, 2015, with English translation of relevant parts.

* cited by examiner

CONICAL FRICTION RING TRANSMISSION AND METHOD FOR OPERATING A CONICAL FRICTION RING TRANSMISSION

CROSS REFERENCE TO RELATED APPLICATIONS

This application is the National Stage of PCT/DE2015/100338 filed on Aug. 14, 2015, which claims priority under 35 U.S.C. § 119 of German Application No. 10 2014 013 468.7 filed on Sep. 17, 2014, the disclosures of which are incorporated by reference. The international application under PCT article 21(2) was not published in English.

The invention relates to a conical friction ring transmission having a housing and having main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, in which transmission the friction ring engages around one of the two friction cones and is disposed to be displaceable in the spacing, and in which transmission at least one of the main transmission elements is wetted with fluid by way of a fluid feed.

The invention furthermore relates to a method for operation of a conical friction ring transmission having a housing and having main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, in which transmission the friction ring engages around one of the two friction cones and is displaced in the spacing for variation of a translation ratio, and in which transmission at least one of the main transmission elements is wetted with fluid by way of a fluid feed.

Wetting of at least one of the main transmission elements with fluid can particularly serve for cooling the main transmission element(s) during operation of the conical friction ring transmission, using a fluid in the form of a cooling fluid.

For technical implementation of wetting with a fluid, it is known from WO 2007/025522 A2, for example, to provide fluid jet nozzles for the fluid feed and/or to roll sub-regions of one or more of the main transmission elements in a fluid sump, so that at least one of the main transmission elements, particularly the friction ring, can be wetted with the fluid by means of the rolling movement or the rotational movement.

It is the task of the present invention, in the case of a conical friction ring transmission, to allow low-loss but operationally reliable wetting of at least one of the main transmission elements with fluid.

In this regard, the invention proceeds from the basic recognition or the basic idea of conveying fluid in circulation or during wetting itself without pressure, if at all possible, or almost without pressure. Proceeding from this basic recognition, a conical friction ring transmission and a method for operation of a conical friction ring transmission, having the characteristics of the independent claims, are proposed as concrete solutions. Further advantageous embodiments are found in the dependent claims and in the following description.

A conical friction ring transmission having a housing and having main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, in which transmission the friction ring engages around one of the two friction cones and is disposed to be displaceable in the spacing, and in which transmission at least one of the main transmission elements is wetted with fluid or liquid by way of a fluid feed or liquid feed, can be characterized in that the fluid feed has an overflow and/or outlet from which the fluid falls onto the main transmission element.

A conical friction ring transmission having a housing and having main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, in which transmission the friction ring engages around one of the two friction cones and is disposed to be displaceable in the spacing, and in which transmission at least one of the main transmission elements is wetted with fluid or liquid by way of a fluid feed or liquid feed, can be characterized in that the fluid feed has a drop dispenser from which the fluid falls onto the main transmission element.

In contrast to the conical friction ring transmission known from WO 2007/025522 A2, in which fluid jet nozzles are provided for wetting the main transmission elements with a fluid, the use of which nozzles is connected with fluid losses as the result of the nozzle effect, very low-loss wetting with the fluid can be achieved by provision of a drop dispenser, from which fluid can drip or does drip onto the respective main transmission element—in other words wetting in which only a very small amount of the total fluid provided for wetting does not come into contact with the respective main transmission element as a consequence of the wetting process.

The very low-loss wetting with the fluid is the consequence, among other things, of the circumstance that the respective fluid is conveyed by the effect of gravity, almost without pressure, by means of the drop-by-drop wetting—very much in contrast to the method of procedure known from WO 2007/025522 A2, in which the fluid is pressed through a fluid jet nozzle under the effect of pressure. In particular, drop-by-drop wetting can also be carried out in operationally reliable manner.

Low-loss and operationally reliable wetting can also be advantageously undertaken by means of provision of an overflow or outlet, from which the fluid falls onto the main transmission element—analogous to the reasons only explained for the drop dispenser—specifically as a consequence of the circumstances that almost pressure-free conveying of the fluid takes place by allowing the fluid to fall onto the respective main transmission element.

Because wetting of the main transmission element takes place by means of the effect of gravity, by provision of the drop dispenser or provision of the overflow or outlet, the fluid path, which comes ahead of the dripping-down or falling-down process in terms of time, can advantageously be made available without any great conveying pressure.

Conveying of the fluid can preferably take place with the involvement of a fluid circuit, which can comprise a fluid sump for accommodation of the fluid, in which one or more of the main transmission elements can roll or rotate, for example, in order to implement wetting cumulatively to wetting by means of the drop dispenser or the outlet. The fluid can then advantageously be conveyed out of the fluid sump to the drop dispenser or overflow and/or outlet, by way of the fluid circuit provided, from where it is finally passed back to the fluid sump, at least in part, after wetting by means of the drop dispenser or the overflow and/or outlet, because after all, part of the fluid can also evaporate, particularly if it is used as a coolant or cooling fluid or cooling liquid.

The drop dispenser or the overflow and/or outlet can advantageously be implemented, for example, by means of provision of holes, which are configured in a metal sheet or in a sheet-metal tub or in a sheet-metal gutter, for example. Particularly by means of provision of a metal sheet or by means of provision of a sheet-metal material for forming the drop dispenser or outlet, a drop dispenser or the outlet can advantageously be made available on the conical friction ring transmission, in low-weight and cost-advantageous manner.

Depending on the size of the holes, these can be provided either for the formation of the drop dispenser or for the formation of the outlet, so that even if a certain hole size is exceeded, which size particularly depends on the viscous properties of the respective fluid, an outlet can be made available. Below this hole size, the respective hole could serve as a drop dispenser, but not as an outlet.

Likewise, however, other arrangements, such as, for example, projections or the like could be used for drop formation and thereby as a part of the drop dispenser. Also, a gutter can be used as an overflow, for example, and then modules that promote the formation of drops can be provided at another location that follows the overflow or the outlet.

A conical friction ring transmission having a housing and having main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, and in which transmission at least one of the main transmission elements is wetted with fluid by way of a fluid feed, can also be characterized in that the conical friction ring transmission has a circulation in which the fluid is guided or can be guided for wetting, and which is set up for guiding the fluid at a pressure below 100 kPa (1 bar).

By means of guiding the fluid in a circulation at a pressure below 100 kPa, low-loss and operationally reliable wetting of at least one of the main transmission elements with the fluid can be advantageously implemented, specifically as the result of the circumstance that high-loss wetting—as it is to be expected in the case of the solution known from WO 2007/025522 A2, as the consequence of the provision of fluid jet nozzles that require a significantly greater conveying pressure—cannot occur due to pressures or conveying pressures below 100 kPa.

In the case of a practical embodiment, the drop dispenser can comprise a drip gutter. For technical implementation of drop dispensing, in this regard the drip gutter can particularly have a plurality of holes that pass through the drip gutter, which holes can particularly be disposed to follow one another, in order to advantageously arrange them over the entire length of one of the friction cones or over a partial length of the entire length of the friction cone, at a distance from the latter. In this way, uniform wetting of the respective cone with the fluid can advantageously be made possible. If necessary, the gutter can also overflow and thereby the overflow can be utilized to make the fluid available, wherein this can happen, if applicable, in the form of drops that drip off the gutter or in some other gravity-related way.

In the case of a further practical embodiment, the outlet can comprise an outlet gutter or the overflow can comprise an overflow gutter. An outlet gutter of the outlet can also comprise a plurality or great number of holes disposed to follow one another, which holes are formed in the outlet gutter, accompanied by uniform wetting, as has already been explained above for the drip gutter.

It can be particularly advantageous if the overflow comprises an overflow gutter, so that the fluid falls onto the respective main transmission element by way of the outlet only after a corresponding fluid level has been exceeded. In this way, operationally very reliable wetting of the respective main transmission element with the fluid can be made available, specifically as the result of the significant reduction of fluid movements before it runs out, which becomes possible due to the overflow.

In order to implement the drop dispenser in simple and practical manner, the outlet can advantageously be configured as a drop dispenser. Thus, for example, the outlet can have at least one or more holes formed in a metal sheet or in a sheet-metal tub or a sheet-metal gutter, the size of which holes is dimensioned in such a manner that the fluid falls downward out of the holes drop by drop. For this purpose, the size of the holes is advantageously adapted to the respective viscosity of the fluid, in order to implement drop-by-drop falling of the fluid.

In particular, the outlet configured as a drop dispenser can be an overflow, accompanied by the advantageous effects already explained above for the overflow gutter.

In a practical embodiment, the drop dispenser and/or the overflow and/or outlet is/are disposed on the housing, preferably directly on a housing wall. The fluid feed or the drop dispenser and/or the outlet can be integrated into the conical friction ring transmission in structurally simple and compact manner by means of placing the drop dispenser and/or the outlet on the housing, preferably directly on a housing wall of the housing. Particularly preferably, the drop dispenser and/or the outlet is/are disposed on a side of the housing wall of the housing that faces the respective friction cone, in order to keep the wetting paths—in other words the paths to be traveled by the fluid from the drop dispenser or the overflow and/or outlet up to the respective friction cone—as small as possible, accompanied by very low-loss and operationally reliable wetting.

The drop dispenser or the outlet and/or overflow can preferably—if they comprise a gutter—be disposed in such a manner that the respective gutter runs parallel to the housing wall and/or is covered by the housing wall.

By means of covering the gutter with the housing wall, the gutter, together with the side of the housing wall that faces the gutter, can form a closed fluid channel for feeding the fluid to the openings formed in the respective gutter. As a result of the covering provided, formation of this fluid channel can advantageously be implemented in structurally simple manner. In this regard, the covering does not necessarily have to be sealed. Instead, it is conceivable that fluid can overflow between covering and gutter, if a particularly large amount of fluid is made available at the fluid feed in specific operating states.

Because of the parallel placement of the gutter relative to the housing wall, operationally reliable attachment of the gutter can be implemented in structurally simple manner.

To implement gravity-driven dripping or falling of the fluid onto the main transmission element, the drop dispenser and/or the overflow and/or outlet is/are disposed above the main transmission element to be wetted.

The fluid can be any fluid provided for operation of the conical friction ring transmission. In particular, the fluid can be a cooling fluid for cooling the respective main transmission element during operation of the conical friction ring transmission.

The conical friction ring transmission has at least a first friction cone, a second friction cone, and a friction ring, wherein the two friction cones interact with one another by means of the friction ring, using friction. Torque can be transmitted between the two friction cones by way of the friction ring disposed between the two friction cones. In this regard, the fluid can particularly also be a traction fluid, such as naphthene oil, for example, which is used for transfer of torque in connection with the friction ring between the two friction cones. In this case, transfer of torque takes place by way of shear stresses of the traction fluid in the respective interstice or spacing, thereby making it possible to completely prevent abrasive wear of the usually metallic contact surfaces in an ideal case.

By means of the low-pressure conveying or dripping or outflow during wetting of the respective main transmission element with the fluid, losses are also minimized, which consist in that the fluid is subject to less stress during conveying or wetting. This is particularly advantageous in the case of a fluid in the form of a traction fluid, the torque transfer properties of which react very sensitively to excessive pressure stresses.

A method for operation of a conical friction ring transmission having a housing and main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, in which transmission the friction ring engages around one of the two friction cones and is displaced in the spacing for variation of a translation ratio, and in which transmission at least one of the main transmission elements is wetted with fluid by way of a fluid feed, can be characterized in that for wetting, the fluid is guided in a circulation with an overflow and/or outlet at a pressure below 100 kPa (one bar).

In comparison with the fluid feed known from WO 2007/025522 A2—which provides for wetting with the fluid by means of fluid jet nozzles, as explained above—comparatively low-pressure conveying of the fluid takes place by means of guiding the fluid in a circulation at a pressure below 100 kPa (1 bar). In this manner, low-loss but also operationally reliable wetting of the main transmission elements with the fluid is therefore possible.

As has already been explained above, the circulation or fluid circuit can comprise a fluid sump, in particularly advantageous manner, in which sump one or more of the main transmission elements can roll, so that cumulatively, wetting of at least one of the main transmission elements with the fluid can also be implemented by means of the rolling or rotation in the fluid sump.

In a practical embodiment of the conical friction ring transmission or of the method for operation of a conical friction ring transmission, the fluid feed comprises a heat exchanger and/or a filter. Tempering of the fluid can take place in simple and practical manner—particularly in operationally reliable manner—by means of provision of the heat exchanger. The filter can be provided for advantageous removal or prevention of undesirable particles or other impurities.

In a further practical embodiment of the conical friction ring transmission or of the operating method, the fluid feed can comprise an electric pump. By means of provision of an electric pump, the respective fluid can be supplied to the drop dispenser or the outlet in very operationally reliable manner, because use of an electric pump brings with it the advantage that the pump can be operated on its own and independent of the main drive motor, and therefore is not subject to possible failures or fluctuations of the main drive motor.

A method for operation of a conical friction ring transmission, having a housing and having main transmission elements disposed in the housing, which elements comprise at least a first friction cone, a second friction cone, and a friction ring, in which transmission the two friction cones interact with one another by means of the friction ring, using friction, and are disposed spaced apart from one another by a fixed spacing, in which transmission the friction ring engages around one of the two friction cones and is displaced in the spacing for variation of a translation ratio, and in which transmission at least one of the main transmission elements is wetted with fluid by way of a fluid feed, can be characterized in that the fluid for wetting is dripped onto the main transmission element by means of a drop dispenser of the fluid feed and/or that the fluid is allowed to fall onto the main transmission element from an overflow and/or outlet of the fluid feed.

Wetting by means of dripping of the fluid onto the main transmission element as provided or by means of allowing the fluid to fall onto the main transmission element as provided is connected with the advantageous effects as already explained above.

It is understood that the characteristics of the solutions described above and in the claims can also be combined, if applicable, in order to be able to implement the advantages cumulatively, accordingly.

Further advantages, goals, and properties of the present invention will be explained using the following description of exemplary embodiments, which are particularly also shown in the appended drawing. The drawing shows.

Figure 1:
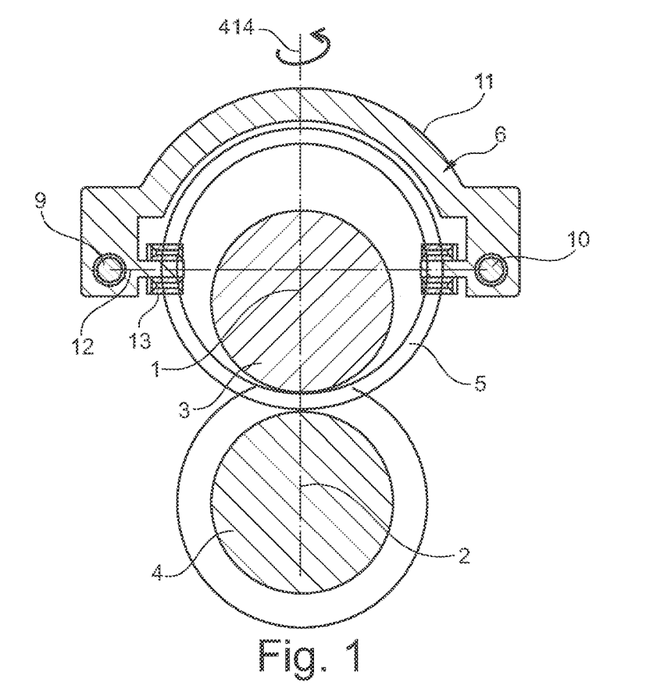
FIG. 1 a schematic cross-section through a conical friction ring transmission along the line I-I in FIG. 2, for an explanation of the general technological background.
Figure 2:
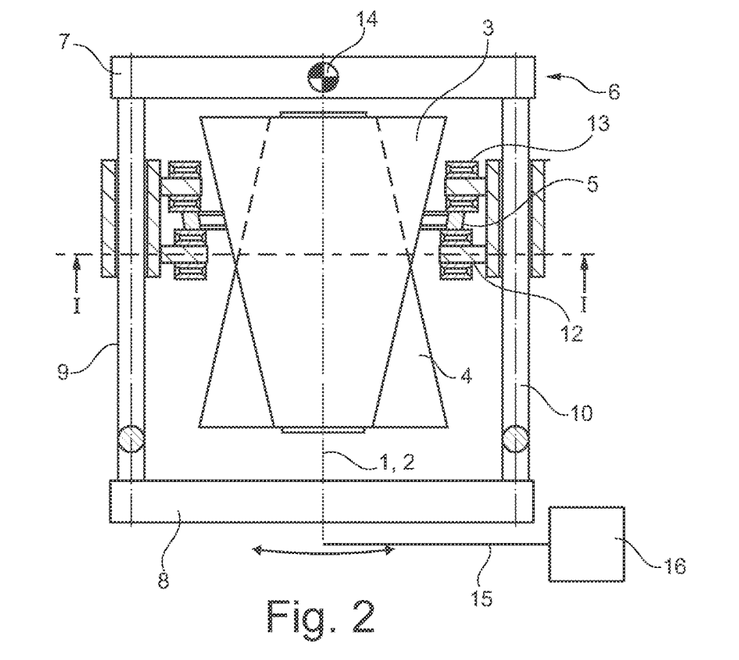
FIG. 2 a top view relating to FIG. 1.

FIGS. 1 and 2 schematically show a conical friction ring transmission.

It consists essentially of two friction cones 3, 4 disposed on parallel axes 1, 2 with a radial spacing, which cones are disposed in opposite directions from one another and have the same cone angle β. A friction ring 5 that fills the interstice between the cones 3, 4 is disposed between them; it surrounds the friction cone 3 and is held in a cage 6.

The cage 6 consists of a frame that is formed by two crossheads 7, 8 and two parallel axles 9, 10 accommodated in them. These axles 9, 10 are disposed parallel to the axes 1, 2 and, at the same time, to the generatrix of the friction cones 3, 4 inclined at the angle β and carry an adjustment bridge 11 having two journals 12 that face one another, on which a guide roller 13 sits, in each instance. The guide rollers. 13 engage on both sides of the friction ring 5 and give this ring the required axial guidance.

The center of the crosshead 7 is formed by a vertical axis of rotation 14, about which the entire cage 6 can be pivoted. For this purpose, the lower crosshead 8 is connected with a transverse drive 15 that engages on it, not shown in any detail, and an adjustment motor 16.

In the exemplary embodiment, the axis of rotation 14 lies in the plane determined by the axes of rotation of the friction cones 3, 4. It can also lie in a plane parallel to this or can intersect the first plane mentioned at an acute angle.

If the cage 6 is pivoted by several degrees of angle, the friction drive brings about axial adjustment of the adjustment bridge 11 and thereby a change in the translation ratio of the friction cones. A tiny expenditure of energy is sufficient for this.

Figure 3:
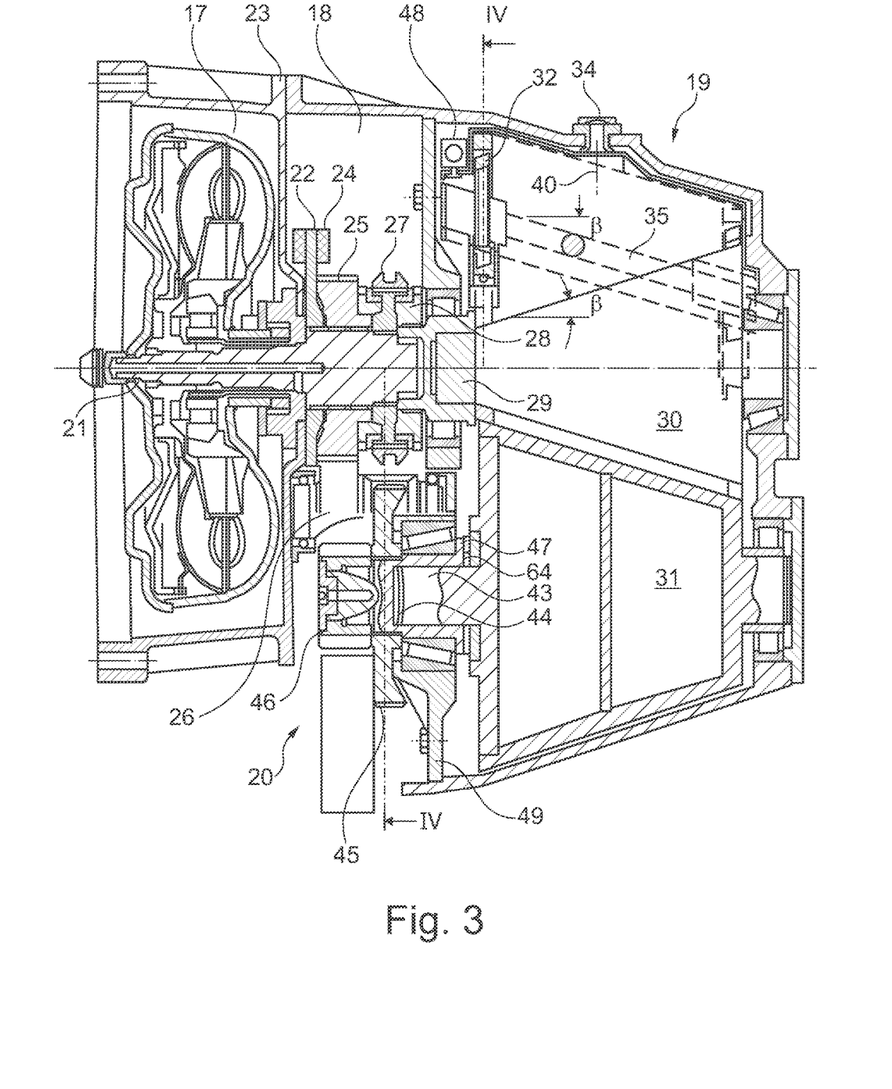
FIG. 3 a longitudinal section through a vehicle drive for a front-wheel drive with a conical friction ring transmission, for an explanation of the general technological background.

FIG. 3 shows a front-wheel drive for a vehicle having a conical friction ring transmission. It consists essentially of a hydraulic converter or a fluid coupling 17, a switching unit 18 that follows the coupling, a conical friction ring transmission 19, and a power take-off 20.

The power take-off part of the fluid coupling 17 sits on a shaft 21, on which a brake disk 22 is also disposed, which disk interacts with brake shoes 24 held in the housing 23 and can be electronically controlled.

A free-running gear wheel 25 sits directly behind the brake disk 22; it stands in engagement with an intermediate gear 26, shown only in part, and can bring about the reverse gear in the power take-off 20. The gear wheel 25 has a crown gearing on one side, with which it can be brought into engagement with a switching cuff 27 that is held on the shaft 21, is axially displaceable, and has an inner axial gearing, and can be activated.

If a reversal of the direction of rotation is desired, first the brake 22, 24 is activated, so that the subsequent transmission is not impaired by the torque shock. Then, the switching cuff 27 in FIG. 3 is moved to the right from its neutral position shown there, and enters into engagement with a pinion 28, which is firmly connected with the drive shaft 29 of a friction cone 30 of the conical friction ring transmission 19.

The conical friction ring transmission 19 also consists, as was already described using the exemplary embodiment shown in FIGS. 1 and 2, of two friction cones 30, 31 disposed opposite one another and at a radial spacing from one another, having the same cone angle β and parallel axes. Furthermore, the upper friction cone 20 is surrounded by a friction ring 32, which stands in friction engagement with the friction cone 30 with its inner mantle surface and with the friction cone 31 with its outer mantle surface.

The two friction cones 30, 31 can have different diameters, as shown, and in this way, a translation stage in the subsequent power take-off 20 is saved, if applicable.

For weight reasons, the friction cones 30, 31 can also be configured to be hollow, because only their mantle surfaces are important.

Figure 4:
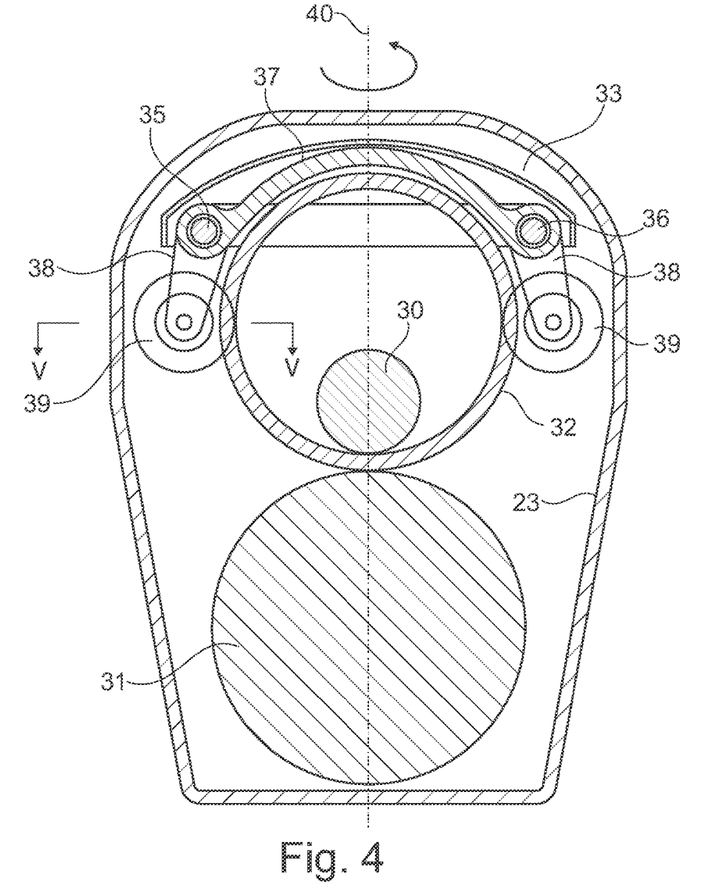
FIG. 4 another representation of the adjustment device according to a section IV-IV in FIG. 3.
Figure 5:
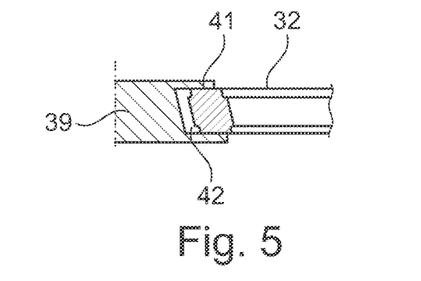
FIG. 5 a detail of FIG. 4 in longitudinal section.

The friction ring 32, as FIGS. 4 and 5 also show, is held in a cage 33, which is disposed so as to pivot in the housing about an axis of rotation 40, at the location 34 (FIG. 3), which axis lies in the plane determined by the axes of rotation of the friction cones 30, 31. In order to avoid long pivot paths, it lies approximately in the center of the axial length of the friction cones 30, 31. The axis of rotation 40 can also, as mentioned above, lie in a plane parallel to this or can intersect the plane first mentioned at an acute angle.

Two parallel axles 35, 36 are held in the cage 33; their inclination angle β relative to the horizontal is equal to the cone angle β of the friction cones 30, 31. An adjustment bridge 37 is guided on these axles 35, 36, which bridge has attachments 38 on which guide rollers 39 are mounted. These rollers have a circumferential groove 41, as FIG. 5 shows, and engage around the friction ring 32 with their flanges 42.

The friction ring can, as shown, be disposed with its axis parallel to the axes of the friction cones 30, 31. However, it can also be held in the cage in such a manner that its axis lies parallel to the generatrix of the friction cones 30, 31 that face one another, and stands perpendicular on the mantle surface of the friction cones.

An adjustment spindle 48 mounted in the housing 23 is provided for adjustment of the cage 33, which spindle is connected with an adjustment motor or magnet, not shown, and engages on the cage 33.

In the event of a slight rotation of the cage 33, the friction ring 32 is rotated about the axis 40, thereby changing the position relative to the friction cones, so that the friction ring 32 automatically moves its position and changes the translation ratio of the conical friction ring transmission 19.

The power take-off shaft 43 of, the friction cone 31 is accommodated in a press-down device 44, which in turn is mounted in the housing 23, and carries power take-off pinions 45, 46.

The press-down device 44 consists of an extension shaft that engages over the power take-off shaft 43, having a flange 47 that faces the friction cone 31, having a radial gearing 64 that interacts with a corresponding radial gearing on the friction cone 31. The radial gearing 64 brings about an axial pressure on the friction cone 31.

It is advantageous if the housing 23 is divided into compartments by means of a partition wall 49, between the drive and power take-off 17, 18, 20, on the one hand, and the conical friction ring transmission 19, on the other hand. In this way, it is possible to allow a cooling fluid without lubrication properties, for example silicone oil, to flow into the housing part for the conical friction ring transmission 19, so that the friction value is not influenced. Traction fluids or oils with ceramic powder or other solid particles and, in particular, naphthene oil are also suitable as a cooling fluid for the conical friction ring transmission.

It is advantageous if the friction surfaces of at least one transmission part of the conical friction ring transmission, for example the friction cones 30, 31 or the friction ring 32, consist of a coating composed of hard metal or ceramic, for example titanium nitride, titanium carbonitride, titanium aluminum nitride or the like.

Figure 6:
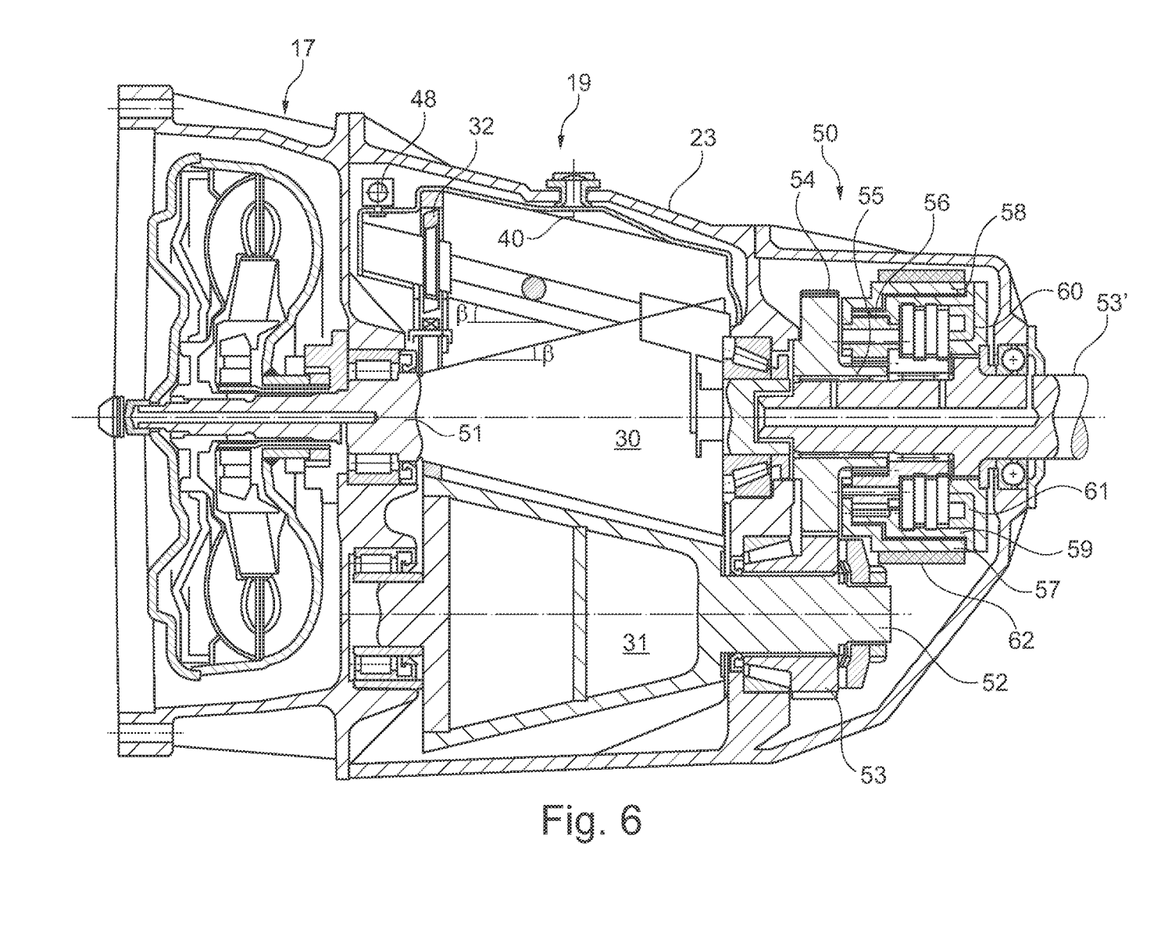
FIG. 6 a longitudinal section through a rear-wheel drive for a vehicle with a conical friction ring transmission for an explanation of the general technological background.

FIG. 6 shows the use of the conical friction ring transmission in a rear-wheel drive of a vehicle.

A fluid coupling or a hydraulic converter 17 is situated in front of a conical friction ring transmission 19, and a planetary gear 50 is situated behind the conical friction ring transmission 19.

The power take-off shaft of the fluid coupling 17 simultaneously forms the shaft 51 of the upper friction cone 30, which, by way of the friction ring 32, drives a lower friction cone 31 on the power take-off shaft 52 of which a pinion 53 sits, which meshes with a freely rotatable gear wheel 54 that sits on a transmission power take-off shaft 53'. The transmission power take-off shaft 53' aligns with the shaft 51 and is accommodated in it so as to rotate freely.

A pinion 55 connected in one piece with the gear wheel 54 forms the sun wheel of the planetary gear 50. This meshes with planetary gear wheels 56, which are held in a planetary carrier 57, which is able to run around the transmission power take-off shaft 53'. The planetary carrier 57 has a cylindrical attachment 58 that encloses a ring gear 59, which meshes with the planetary gear wheels 56 and is firmly connected with the transmission power take-off shaft 53' by way of a longitudinal gearing 60.

Furthermore, a multi-plate clutch 61 is provided in the planetary gear 50, which clutch is able to connect the transmission power take-off shaft 53' with the ring gear 59. Finally, a brake 62 is assigned to the cylindrical attachment 58 of the planetary carrier 54.

The forward drive is turned on by means of activation of the multi-plate clutch 61. If the brake 62 is activated, the planetary carrier 57 is held in place and a change in the direction of rotation of the transmission power take-off shaft 53' takes place, in other words reverse drive.

Figure 7:
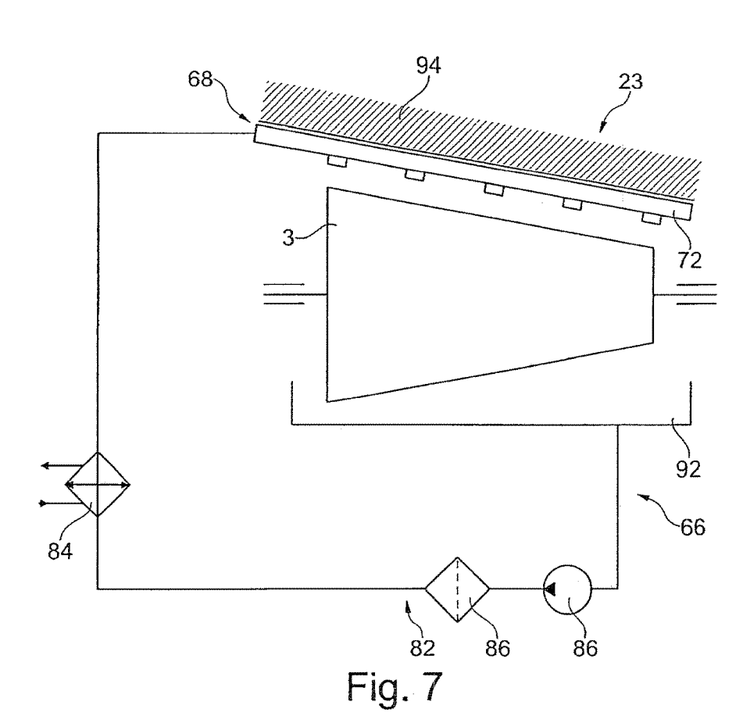
FIG. 7 a schematic detail representation of an exemplary embodiment of a conical friction ring transmission.

The conical friction ring transmission according to FIG. 7 has a housing 23 and main transmission elements disposed in the housing 23, which elements comprise a first friction cone 3, a second friction cone, and a friction ring. In the representation according to FIG. 7, only the first friction cone 3 of these main transmission elements is shown. In this regard, the schematic representation according to FIG. 7 also does not show the further characteristics of the exemplary embodiment, according to which the two friction cones interact with one another by means of the friction ring, using friction, and are disposed spaced apart from one another by a fixed spacing, and according to which the friction ring engages around one of the two friction cones and is disposed to be displaced in the spacing. It is understood that the conical friction ring transmissions explained above using FIGS. 1 to 6, for example, can be used as the conical friction ring transmission shown in FIG. 7, wherein—if applicable—other conical friction ring transmissions, for example with a different positioning possibility of the friction ring or with a different embodiment of the other design details, can, also be used accordingly.

The conical friction ring transmission according to FIG. 7 furthermore has a fluid feed 66 for wetting the main transmission elements, particularly the two friction cones, with a fluid.

The fluid feed 66 has a drop dispenser 68, from which fluid drips or can be dripped onto the main transmission elements, particularly the friction cones, wherein for this purpose, the drop dispenser 68 is disposed above the main transmission element to be wetted or the main transmission elements to be wetted.

Furthermore, the fluid feed has a circulation 82 in which the fluid is guided or can be guided. For tempering the fluid and for removing possible disruptive particles that might be present, a heat exchanger 84 and a filter 86 are furthermore provided. An electric pump 88 is also provided for implementation of the circulating flow.

In order to implement wetting technically, fluid present or accommodated in a fluid sump 92 is supplied to the drop dispenser 68 by means of the electric pump 88, by way of the circulation 82, from where the fluid drips onto at least one of the main transmission elements, particularly also onto the friction cone 3, for the purpose of wetting the same. Aside from fluid portions that might be present, which escape during operation of the conical friction ring transmission by means of heat or heat development, and the accompanying evaporation or leakages, the fluid that has dripped off from the drop dispenser 68 gets back into the fluid sump 92.

Figures 8, 9, 10:
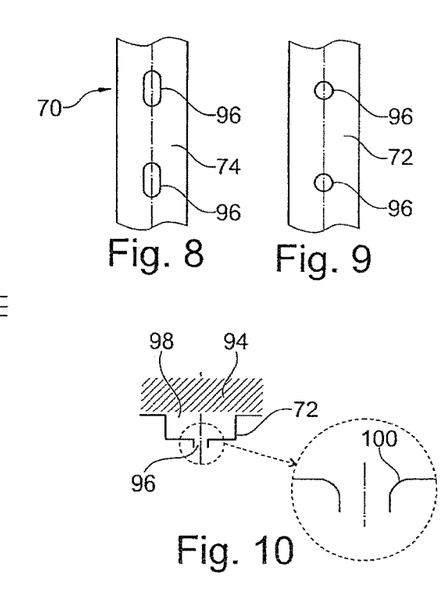
FIG. 8 a schematic representation of an outlet gutter in a top view.
FIG. 9 a schematic representation of a drip gutter in a top view.
FIG. 10 a schematic sectional representation of the drip gutter according to FIG. 9.

The drop dispenser 68 comprises a drip gutter 72 according to FIGS. 9 and 10. The drip gutter 72 has a plurality of holes 96 disposed to follow one another in the longitudinal direction of the drip gutter 72, which holes 96 pass through the drip gutter 72 (see also FIG. 7). The holes 96 that are provided are dimensioned in such a manner that they allow drop-by-drop falling onto the respective main transmission element, wherein the viscosity of the respective fluid was taken into consideration in the dimensioning of the hole size.

The openings 96 of the drip gutter 72 are provided with arc-shaped regions 100 to make available dripping of the fluid out of the openings 96 having arc-shaped regions 100, which dripping is as flow-optimized as possible (see the enlarged detail representation in FIG. 10).

The drop dispenser 68 or the drip gutter 72 is directly disposed on the housing wall 94 of the housing 23. The drip gutter 72 runs parallel to the housing wall 94 and—as shown in FIG. 10—is covered by the housing wall 94. A fluid channel 98 for the drip gutter 72 can advantageously be created by the covering provided, in structurally simple and operationally reliable manner.

Alternatively or cumulatively, the fluid feed 66 can have an outlet 70 that comprises an outlet gutter 74 (see also FIG. 8). In contrast to the drip gutter 72 according to FIG. 9, the holes are configured in the form of oblong holes in the case of the outlet gutter according to FIG. 8, in order to implement the outlet, so that the fluid can fall onto at least one of the main transmission elements by way of the holes 96.

Figure 11:
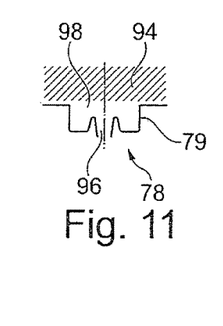
FIG. 11 a schematic sectional representation of an outlet that comprises an overflow gutter.

Not only the drip gutter 72 but also the outlet gutter 74 can also be configured, alternatively, in the form of an overflow gutter 76 according to FIG. 11 to implement an overflow 78. The overflow gutter 76 according to FIG. 11 can also—as illustrated—be disposed directly on the housing wall 94 to form a fluid channel 98, and can be covered by this wall.

Depending on the concrete implementation, excess fluid can also overflow between housing 23 or housing wall 94 and the gutters 72, 74, 76, if necessary, so that the gutters 72, 74, 76 themselves serve as an overflow.

In these exemplary embodiments, the gutters 72, 74, 76 are produced from a sheet-metal material, in structurally simple manner, wherein in other embodiments, they can also be produced in different manner or from different materials.

The fluid, which is supplied to the main transmission elements by means of the fluid feed 66, can particularly be a cooling fluid for cooling the main transmission elements or a traction fluid for transfer of torque from the first friction cone 3 to the second friction cone, by way of the friction ring, such as naphthene oil, for example, with the transfer taking place in as contact-free a manner as possible.

The method for operation of a conical friction ring transmission according to FIGS. 7 to 11, in which at least one of the main transmission elements—in other words the friction cone 3, for example—is wetted with fluid by way of the fluid feed 66, the fluid for wetting is guided in a circulation 82 at a pressure below 100 kPa (one bar). By means of this low pressure and the dripping, losses are significantly minimized in this regard, specifically because the fluid is then subject to less stress during circulation or wetting. This is particularly advantageous in the case of a fluid in the form of a traction fluid, because the torque transfer effect of this fluid reacts very sensitively to overly high pressure stresses.

REFERENCE SYMBOL LIST 1 axis
2 axis
3 friction cone
4 friction cone
5 friction ring
6 cage
7 crosshead
8 crosshead
9 axle
10 axle
11 adjustment bridge
12 journal
13 guide roller
14 axis of rotation
15 transverse drive
16 adjustment motor
17 fluid coupling
18 switching unit
19 conical friction ring transmission
20 power take-off
21 shaft
22 brake disk
23 housing
24 brake shoe
25 gear wheel
26 intermediate gear
27 switching cuff
28 pinion
29 drive shaft
30 friction cone
31 friction cone
32 friction ring
33 cage
34 location
35 axle
36 axle
37 adjustment bridge
38 attachment
39 guide roller
40 axis of rotation
41 circumferential groove
42 flange
43 power take-off shaft
44 press-down device
45 power take-off pinion
46 power take-off pinion
47 flange
48 adjustment spindle
49 partition wall
50 planetary gear
51 shaft
52 power take-off shaft
53 pinion
53' transmission power take-off shaft
54 gear wheel
55 pinion
56 planetary-gear wheel
57 planetary carrier
58 cylindrical attachment
59 ring gear
60 longitudinal gearing
61 multi-plate clutch
62 brake
64 radial gearing
66 fluid feed
68 drop dispenser
70 outlet
72 drop gutter
74 outlet gutter
76 overflow gutter
78 overflow
82 circulation
84 heat exchanger
86 filter
88 electric pump
92 fluid sump
94 housing wall
96 hole
98 fluid channel
100 arc-shaped region

The invention claimed is:

1. A conical friction ring transmission having a housing (23) and having main transmission elements disposed in the housing (23), which elements comprise at least a first friction cone (3,30), a second friction cone (4,31), and a friction ring (5,32), in which transmission the two friction cones interact with one another by means of the friction ring (5,32), using friction, and are disposed spaced apart from one another by a fixed spacing, in which transmission the friction ring (5,32) engages around one of the two friction cones and is disposed to be displaceable in the spacing, and in which transmission at least one of the main transmission elements is wetted with fluid or liquid by way of a fluid feed (66); wherein the fluid feed (66) has an overflow and/or outlet from which the fluid falls onto the main transmission element.

2. The conical friction ring transmission according to claim 1, wherein the outlet (70) comprises an outlet gutter (74), particularly an overflow gutter (76).

3. The conical friction ring transmission according to claim 1, wherein the outlet (70) is configured as a drop dispenser (68).

4. The conical friction ring transmission according to claim 3, wherein the outlet (70) comprises an overflow (78).

5. The conical friction ring transmission according to claim 3, wherein the drip dispenser (68) comprises a drip gutter (72).

6. The conical friction ring transmission according to claim 3, wherein the drop dispenser (68) is disposed above the main transmission element to be wetted.

7. The conical friction ring transmission according to claim 1, wherein the overflow and/or outlet (70) is/are disposed on the housing (23), preferably directly on a housing wall (94).

8. The conical friction ring transmission according to claim 1, wherein the outlet (70) is disposed above the main transmission element to be wetted.

9. The conical friction ring transmission according to claim 1, wherein the fluid feed (66) comprises a heat exchanger (84) and/or a filter (86).

10. The conical friction ring transmission according to claim 1, wherein the fluid feed comprises an electrical pump (88).

11. The conical friction ring transmission according to claim 1, wherein the fluid is a traction fluid.

12. A method for operation of a conical friction ring transmission having a housing (23) and having main transmission elements disposed in the housing (23), which elements comprise at least a first friction cone (3, 30), a second friction cone (4, 31), and a friction ring (5, 32), in which transmission the two friction cones interact with one another by means of the friction ring (5, 32), using friction, and are disposed spaced apart from one another by a fixed spacing, in which transmission the friction ring (5, 32) engages around one of the two friction cones and is displaced in the spacing for variation of a translation ratio, and in which transmission at least one of the main transmission elements is wetted with fluid by way of a fluid feed (66), wherein for wetting, the fluid is guided at a pressure below 100 kPa (1 bar) in circulation (82) with an overflow and/or outlet (70).

\* \* \* \* \*